J. F. TALLEY & J. M. WADLINGTON.
Wagon-Brake.

No. 225,891.     Patented Mar. 23, 1880.

WITNESSES:
Chas. Nida
C. Sedgwick

INVENTOR:
J. F. Talley
J. M. Wadlington
BY Munn & Co.
ATTORNEYS.

UNITED STATES PATENT OFFICE.

JOHN F. TALLEY AND JOHN M. WADLINGTON, OF UPTONVILLE, KENTUCKY.

WAGON-BRAKE.

SPECIFICATION forming part of Letters Patent No. 225,891, dated March 23, 1880.

Application filed December 18, 1879.

*To all whom it may concern:*

Be it known that we, J. FREDERICK TALLEY and JOHN M. WADLINGTON, of Uptonville, in the county of Hardin and State of Kentucky, have invented a new and useful Improvement in Self-Acting Wagon-Brakes, of which the following is a specification.

Figure 1:
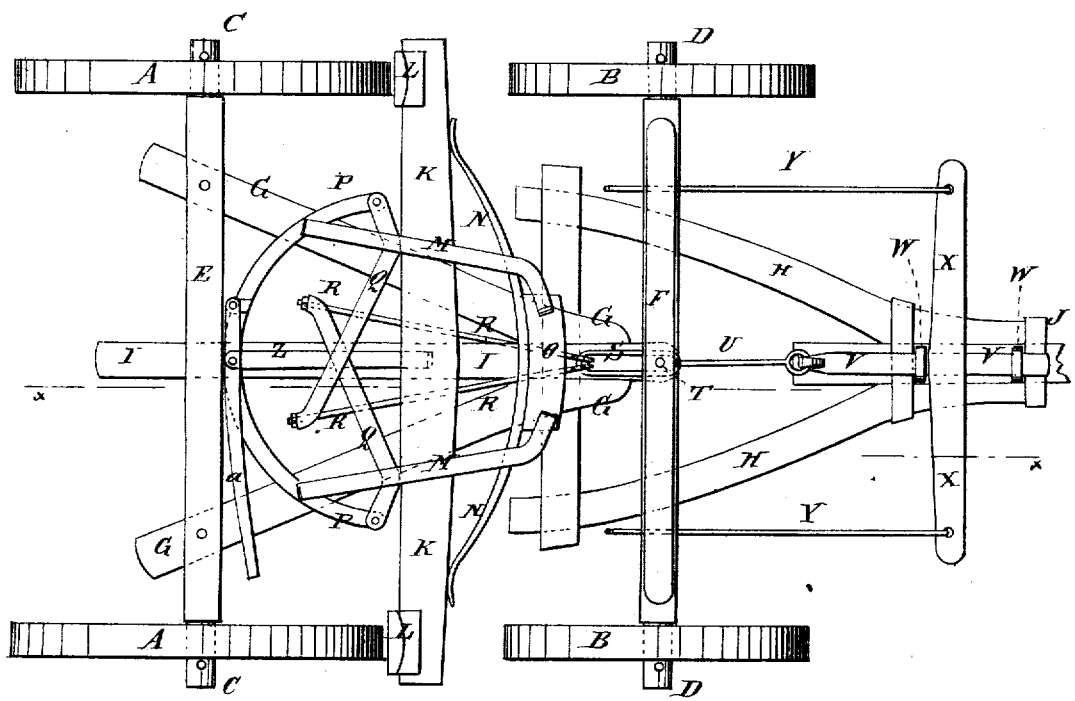
Figure 2:
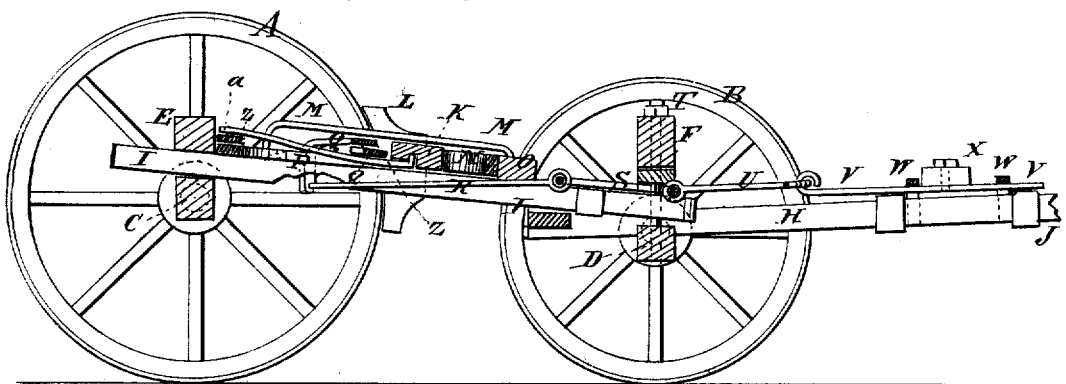

Figure 1 is a plan view of our improvement. Fig. 2 is a sectional side elevation taken through the line $x\ x$, Fig. 1.

The object of this invention is to furnish brakes for wagons and other vehicles so constructed that the brakes will be applied automatically whenever the horses cease to draw.

A represents the rear wheels, B the forward wheels, C the rear axle, D the forward axle, E the rear bolster, F the forward bolster, G the rear hounds, H the forward hounds, I the reach, and J the tongue, of a wagon. K is the brake-bar, which has brake-shoes L attached to its ends, and slides back and forth in long keepers M, attached to the hounds G.

The brake-bar K is pressed back against the wheels A by a curved or half-elliptic spring, N, secured at its middle part to a block, O, attached to the hounds G in front of the said brake-bar K. The ends of the spring N rest against the forward side of the brake-bar K.

To the hounds G is firmly attached a semicircular bar, P, to the ends of which are pivoted the ends of two bent levers, Q. The bends of the levers Q rest against the rear side of the brake-bar K. The inner or long arms of the levers Q cross each other above the reach I, and their ends are bent downward, and to them are attached the rear ends of two rods, R, the forward ends of which are attached to the rear end of the link S. The link S passes forward between the axle D and bolster F, and is kept in place by the kingbolt T, which passes through it.

To the forward end of the link S is pivoted the rear end of the rod U, the forward end of which is pivoted to the rear end of the bar V. The bar V rests upon the tongue J, and slides forward and back in keepers W, attached to the hounds H or to the tongue J.

To the middle part of the sliding bar V is firmly attached the center of the double-tree X, to the ends of which whiffletrees are attached in the usual manner.

To the end parts of the double-tree X are attached chains or straps Y, which are also attached to or connected with the axle D, and which are designed to prevent too much strain from coming upon the spring N.

With this construction, when the vehicle is standing still or is moving upon a downgrade the brake-shoes L will be held against the wheels A by the action of the spring N.

When draft is applied to the double-tree X the first effect of the strain will be to withdraw the brake from the wheels.

With this construction, also, the vehicle, harness, and horses will be free from any jar when starting the vehicle, and will thus be protected from injury by the shock of applying the draft to a dead resistance.

Z is a bar placed upon the rear part of the reach I, with its forward end in a socket or recess in the center of the brake-bar K. The rear end of the bar Z is pivoted to a lever, *a*, which crosses the reach I in front of the rear bolster, E, and its inner end is pivoted to a support attached to the semicircular bar P or to the bolster E.

With this construction, by operating the lever *a* the brake K will be pushed forward away from the wheels A, so that the vehicle can be backed without applying the brake.

The lever *a* may be connected by a chain or rod with an auxiliary lever attached to the wagon-bed, so that it may be operated by the driver from his seat to withdraw the brake and allow the vehicle to be backed.

Having thus described our invention, we claim as new and desire to secure by Letters Patent—

1. The bar Z, resting on the reach and pivoted at its rear to a cross-lever fulcrumed at one end on bar P, in combination with the brake-bar K, having a middle socket to receive the free end of said bar, as shown and described.

2. In a wagon-brake, the combination, with the brake-bar K and the double-tree X, of the bent levers Q, the connecting-bars R, the link S, the rod U, and the sliding bar *a*, substantially as herein shown and described, so that the brake will be withdrawn from the wheels by the application of the draft, as set forth.

JOHN FRED. TALLEY.
JOHN MAHLON WADLINGTON.

Witnesses:
C. M. PEARL,
WILLIAM M. COOK.